Figure 1:
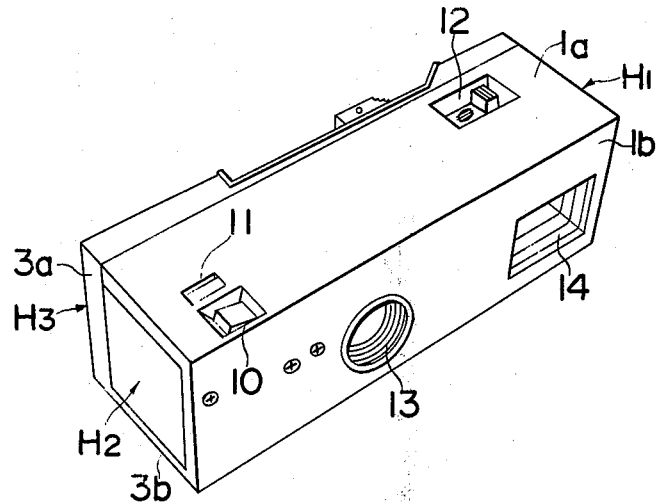

United States Patent [19]
Hamada

[11] 3,896,467
[45] July 22, 1975

[54] COMPACT PHOTOGRAPHIC CAMERA
[75] Inventor: Yoichi Hamada, Nishinomiya, Japan
[73] Assignee: Fuji Photo Film Co., Ltd., Kanagawa, Japan
[22] Filed: Aug. 14, 1973
[21] Appl. No.: 388,301

[30] Foreign Application Priority Data
Sept. 30, 1972  Japan.............................. 47-98311

[52] U.S. Cl.............................. 354/204; 354/206
[51] Int. Cl. ............................................ G03b 19/04
[58] Field of Search............................ 354/204, 206

[56] References Cited
UNITED STATES PATENTS

| | | | |
|---|---|---|---|
| 2,267,794 | 12/1941 | Kosken | 354/246 |
| 2,395,828 | 3/1946 | Kallusch | 354/204 |
| 2,457,679 | 12/1948 | Jones | 354/246 |
| 2,495,224 | 1/1950 | Bodlander | 354/246 |
| 2,591,417 | 4/1952 | Frye | 354/217 |
| 2,931,283 | 4/1960 | Schreiber | 354/213 |

Primary Examiner—John M. Horan
Attorney, Agent, or Firm—Sughrue, Rothwell, Mion, Zinn and Macpeak

[57] ABSTRACT

A compact photographic camera which can be used without substantially requiring any skill in camera handling procedures. To this end, the compact camera includes a lens assembly, a built-in film, a shutter cocking plate and a shutter plate cooperative with the shutter cocking plate, and a shutter release plate associated with a shutter release button. To take a picture, the shutter cocking plate and the shutter plate are moved to one position by operating a film advance lever. If external force applied to the film advance lever is removed, only the shutter cocking plate returns to the original position. In this condition, depression of the shutter release button causes the shutter plate to return to the original position with the film exposed through the lens assembly.

7 Claims, 17 Drawing Figures

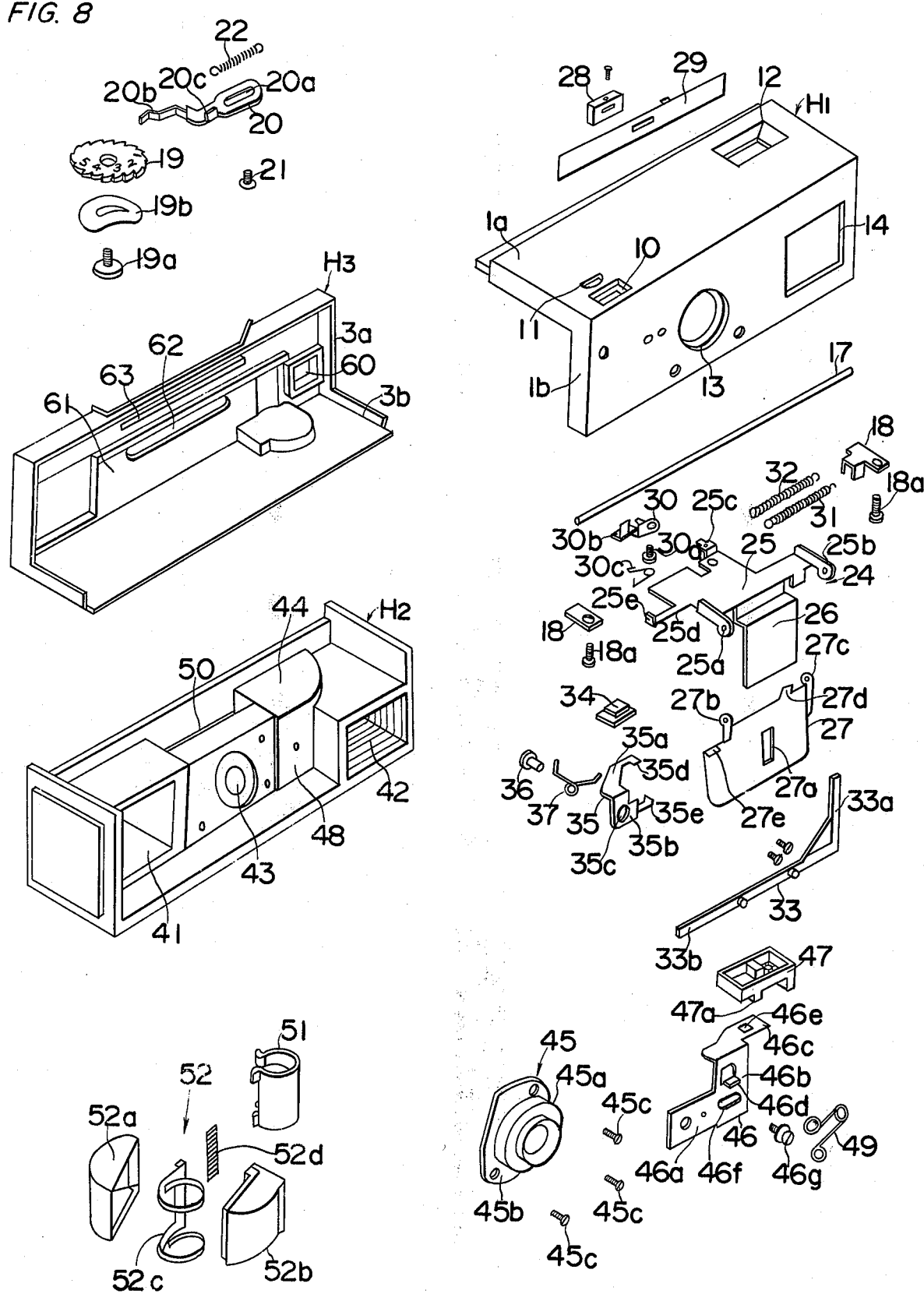

COMPACT PHOTOGRAPHIC CAMERA

The present invention generally relates to a photographic camera and, more particularly, to a compact camera which can be utilized without sustantially requiring any skill of photography.

There is currently available a great variety of cameras. While considerable improvement has been made in the camera construction and photographers can benefit from a variety of techniques, cameras at present available are generally expensive and/or require a user or photographer to be familiar with camera handling procedures. The use of expensive elements in camera construction presents the disadvantage not only that original purchase price is high, but also that eventual repair costs are proportionately, high. Conventional cameras also have the disadvantage that, although their operation does not generally present difficulties to an expert photographer, they are complex from the point of view of less experienced person. Even for an expert photographer, there are many occasions on which it would be preferable to have a camera that is simple in operation and/or that need not be considered as an article of value.

Accordingly, an essential object of the present invention is to provide a compact camera which, as well as being simple in operation, costs only a fraction of the price of a conventional camera of a similar kind.

Another object of the present invention is to provide a compact camera which can be manufactured at a relatively low cost with a minimum number of parts used therein.

A further object of the present invention is to provide a compact camera which can be utilized in making pictures of objects to be photographed without requiring any skill and, hence, without requiring a user or photographer to be accustomed to the camera handling procesures.

In accomplishing these and other objects, there is provided according to the present invention a compact camera comprising three self binding housing components, which may be made of plastic material. Operatively housed in the camera are necessary elements for taking photographs, including a lens assembly, a shutter operating mechanism, and a film advance mechanism, all of which are easily formed and cheap of manufacture. The intended use of the camera is that a user or photographer receives the compact camera with a roll of film loaded therein and, after the roll of film has been exposed, returns the camera without unloading the exposed film. The camera shop will subsequently send the exposed film unloaded from the camera to a processing laboratory. If the user or photographer after having returned the camera wishes to continue to take photographs, what he should do at the camera shop is to ask them to exchange the used camera with another one of the same kind.

Figure 2:
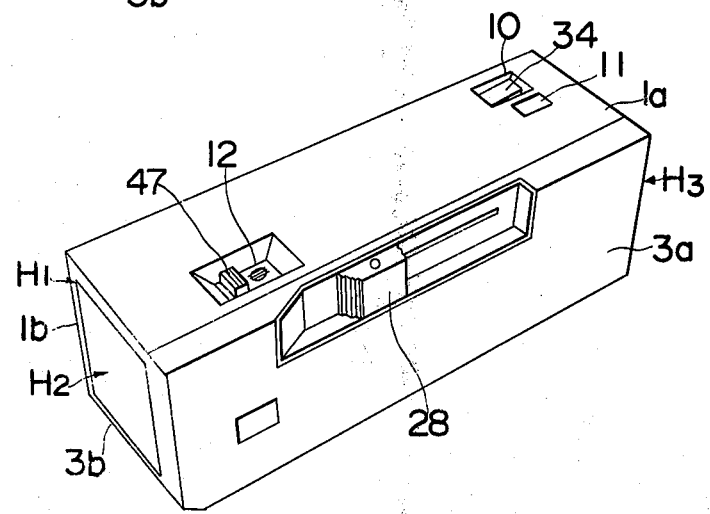
Figure 3:
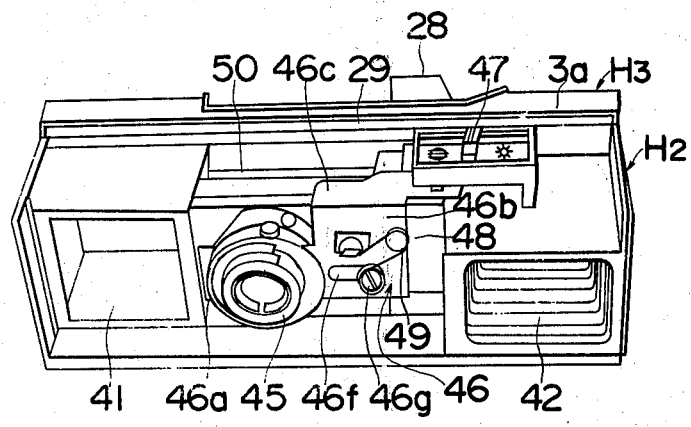
Figure 4:
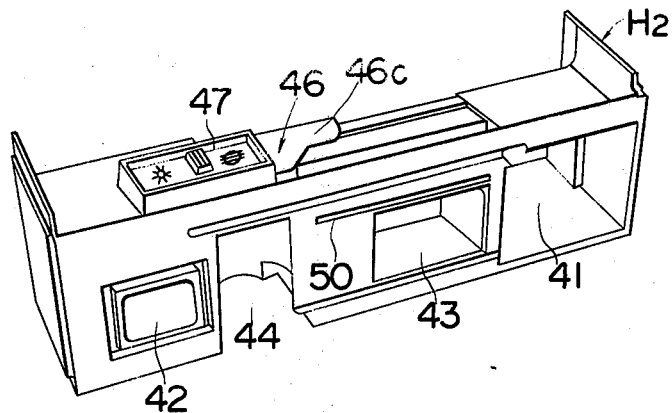
Figure 5:
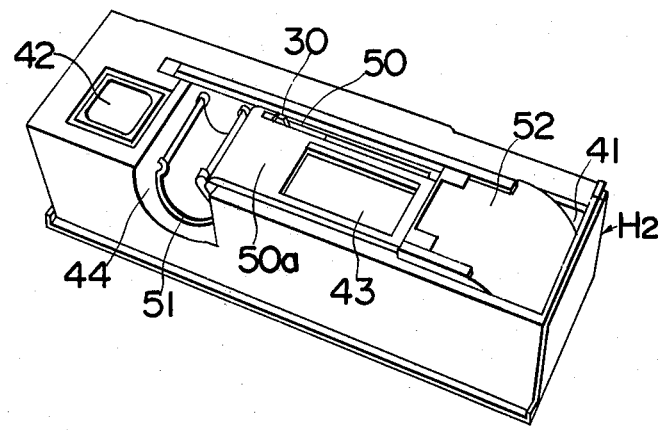
Figure 6:
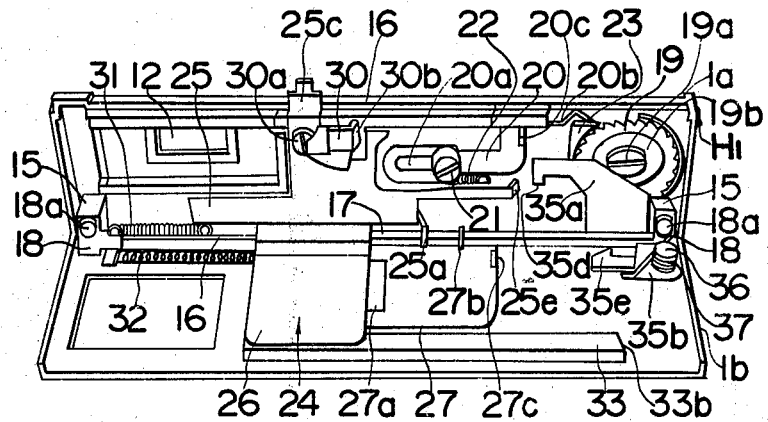
Figure 7:
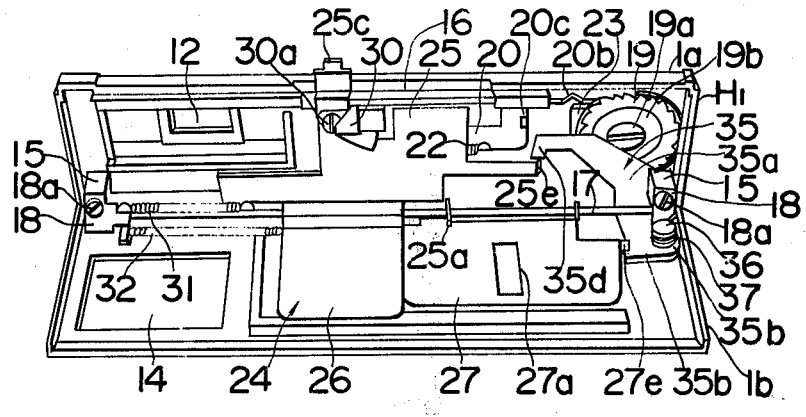
Figure 9:
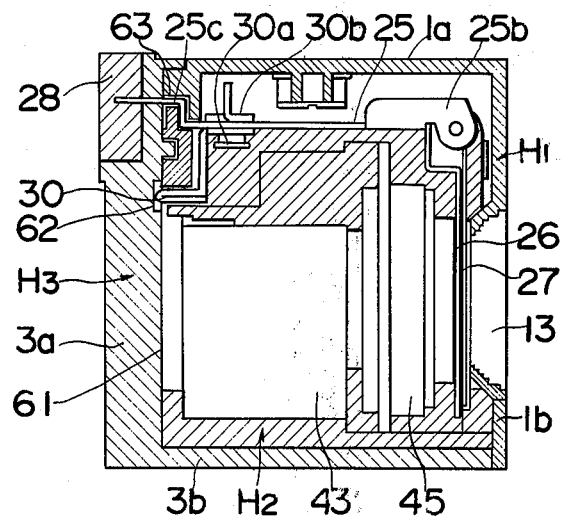
Figure 10A:
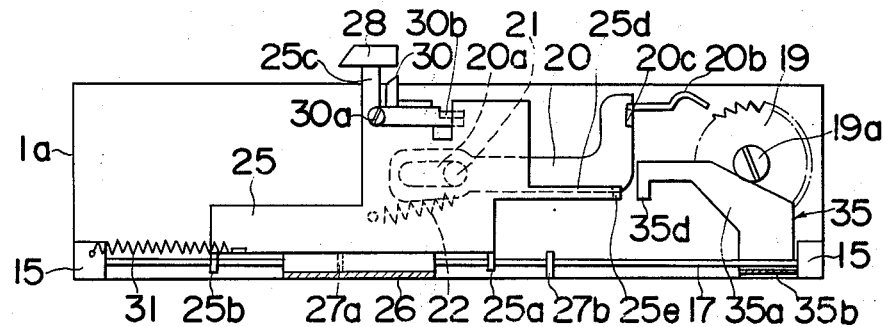
Figure 10B:
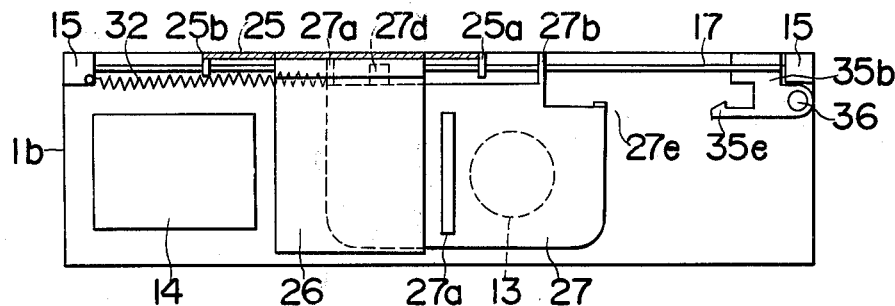
Figure 13A:
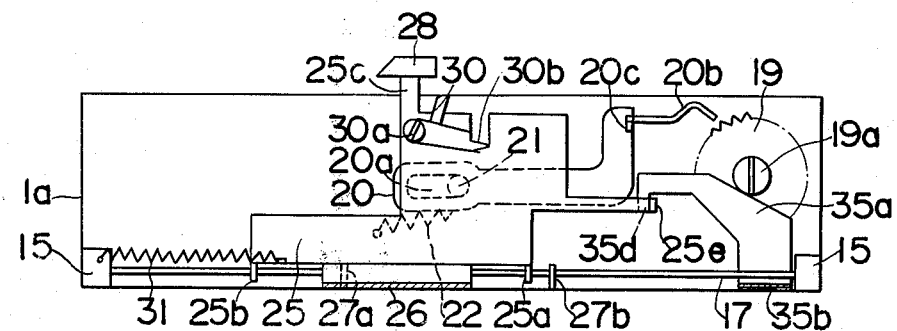

In any event, these and other objects and features of the present invention will become apparent from the following description taken in conjunction with a preferred embodiment thereof with reference to the accompanying drawings, in which;

FIG. 1 is a perspective view of a compact camera according to the present invention, as viewed from the front, FIG. 2 is a perspective view of a compact camera of FIG. 1, as viewed from the rear, FIG. 3 is a perspective view of a compact camera of FIG. 1 with a first housing component removed, FIG. 4 is a perspective view of the compact camera showing the details of a second housing component as viewed from the rear, FIG. 5 is a substantially similar view to FIG. 4, showing the second housing component accommodating a film support and a film cartridge, FIG. 6 is a perspective view of various mechanisms carried by the first housing component, with a film advance lever in one position, FIG. 7 is a similar view to FIG. 6, showing the various mechanisms carried by the first housing component, with the film advance lever in another position, FIG. 8 is an exploded view of the camera according to the present invention, FIG. 9 is a side sectional elevation view taken through the center of the lens opening, FIG. 10 (a) and (b) to FIGS. 13(a) and (b) are schematic diagrams showing the arrangement of the various mechanisms essential in the compact camera according to the present invention, reference to which is made in the description of the operation of the compact camera.

Before the description of the present invention proceeds, it is to be noted that like parts are designated by like reference numerals throughout the several views of the accompanying drawings.

Referring to the accompanying drawings, it will be seen that a compact camera assembled in accordance with the teachings of the present invention comprises a housing structure essentially composed of three bodies, generally designated by H1, H2, and H3, and together forming a substantially rectangular parallelepiped shape. The first body H1 is formed with a pair of wall structures 1a and 1b integrally connected at right angles with each other. Similarly, the third body H3 is formed with a pair of wall structures 3a and 3b integrally connected at right angles with each other. The second body H2 substantially forms a block which fits between the first and third bodies H1 and H3 with the top, front, back and bottom thereof being respectively covered by the wall structures 1a, 1b, 3a and 3b of these bodies H1 and H3, as shown. As clearly described later, the first body H1 carries a shutter operating mechanism, the second body H2 carries a lens assembly and the third body H3 carries a film advance knob. These bodies H1, H2, and H3 are so constructed as to bind to one another by means of a suitable key-and-groove engagement, which permits separation of these bodies from one another, without the use of screws and/or any other attachment means.

In the following description, for the sake of avoiding a possible confusion, various mechanisms of the compact camera necessary to take photographic pictures will be described in the order from those carried by the first, seconnd and third bodies H1, H2, and H3.

Referring first to FIGS. 1, 2, and 6 to 9, the body H1 comprises the wall structure 1a, which occupies the top of the assembled camera in the condition shown in FIGS. 1 and 2 and is formed with a plurality of openings 10, 11 and 12 of different sizes in different locations, and the wall structure 1b which occupies the front of the assembled camera and is formed with a circular opening 13 and a front window 14 of substantially rectangular shape.

As best shown in FIG. 6 and 7, the wall structure 1a has its interior surface rigidly provided, or otherwise integrally formed, with a pair of spaced spacer pieces 15 and a guide recess of substantially L-shape in cross section as at 16, the length of said guide recess 16 being selected in a manner to be described later.

Extending between these spacer pieces 15 is a guide rod 17 having both ends seated in respective grooves (not shown), which are formed in the spacer pieces 15 for receiving such ends of said guide rod 17. The guide rod 17 is firmly secured to the spacer pieces 15 by means of fitting pieces 18 fitted to said spacer pieces 15 by set screws 18a. The guide rod 17 is not only spaced from the interior surface of the wall structure 1a, but also from the interior surface of the wall structure 1b, and it is in parallel relation to both of these interior surfaces of the respective wall structures 1a and 1b.

The wall structure 1a carries a frame counter mechanism which comprises a ratchet wheel rotatably mounted to the interior surface thereof as at 19 by means of a set screw 19a which extends through said ratchet wheel 19 and is tapped into the wall structure 1a. A suitable washer 19b shown in FIG. 8 is interposed between said ratchet wheel 19 and a head portion of said set screw 19a for giving a friction to rotation of said ratchet wheel 19, thereby preventing the latter from arbitrarily rotating about the axis of said set screw 19a. The frame counter mechanism includes, in addition to the ratchet wheel 19, a slider 20 of substantially L-shape having one end formed with a slot 20a and the other end rigidly provided with an elastic nail piece 20b. This slider 20 is slidably supported against the wall structure 1a by a set screw 21 which has a head portion of a diameter greater than the width of said slot 20a and is tapped into the wall structure 1a. While the slider 20 is supported in the manner as hereinabove described, the nail piece 20b is situated in the vicinity of the ratchet wheel 19 in readiness for driving said ratchet wheel 19 in one direction in response to a sliding movement of said slider 20. More specifically, the slider 20 is normally biased in one direction by an elastic member 22, for example, a tension spring in the instance is shown, suspended between said slider 20 and the wall structure 1a. The ratchet wheel 19 can be rotated stepwise by said nail piece 20b only when said slider 20 is moved in the opposite direction against the elastic member 22. For effecting this movement of the slider 20, the slider 20 is formed at the end adjacent to the nail member 20b with an abutment 20c, the function of which will be described later.

It is to be noted that the ratchet wheel 19 has one surface facing the wall structure 1a provided with a numerical marking, engraved or otherwise imprinted thereon, as shown in FIG. 8. This numerical marking may comprise serially numbered figures, which can be individually exposed to the outside through the opening 11 in the wall structure 1a upon stepwise rotation of said ratchet wheel 19, thereby providing a visual indication to a photographer of the number of frames of film either exposed or left unexposed. It is also to be noted that, although the slider 20 in fact tends to pivot about the axis of the set screw 21 by the action of the elastic member 22, the tip of the nail piece 20b is resting on a projection 23, which is, either integrally or separately, formed on the interior surface of the wall structure 1a, so that no pivotal movement of said slider 20 does actually take place.

Referring still to the first body H1, the shutter operating mechanism includes a shutter cocking plate 24 having a trigger portion 25 and a shielding portion 26 and a shutter plate 27 having an exposure slit 27a, said shutter plate 27 being situated between said shielding portion 26 and the interior surface of the wall structure 1b. As best shown in FIG. 8, the shutter cocking plate 24 is of substantially L-shaped cross section and is slidably supported by the guide rod 17 by means of a pair of spaced lugs, which are formed, for example, in the trigger portion 25 as at 25a and 25b, with the trigger and shielding portions 26 and 25 respectively facing the interior surfaces of the wall structures 1a and 1b.

The trigger portion 25 is formed as at 25c with a projection of substantially L-shape which fits to the L-shaped recess 16, the tip of said projection 25c being adapted to be connected with a film advance knob 28 by means of a connecting strip 29 as best seen in FIG. 8. Provided in the trigger portion 25 and adjacent to the projection 25c is a film advance lever 30 selectively engageable in film perforations for transfer of the film one frame to another each time the film advance knob 28 is moved. This film advance lever 30 is pivotally supported by the trigger portion 25 through a screw member 30a tapped therethrough into said portion 25 and has an actuator formed therein as at 30b. The actuator 30b is engageable with the abutment 20c on the slider 20 for moving the latter in the direction against the elastic member 22. A wire spring 30c having one end connected to the film advance lever 30 and the other end to the trigger portion 25 acts to bias the film advance lever 30 in one direction about the axis of the screw member 30a in such a way that, when the film advance knob 28 is moved in one direction, the lever 30 causes the film (not shown) to advance from a film chamber to a film take-up chamber and, when the knob 28 is moved in the opposite direction by the action of a spring member as will be mentioned later, the lever 30 disengages from the film perforation, pivots against the wire spring 30c about the axis of the screw member 30a, and slides in contact with a non-perforated portion of the film, as will become clear later.

It is to be noted that the length of the guide recess 16 along which the film advance knob 28 moves is selected such that each frame of the film used can be completely advanced past the exposed area during a stroke of movement of the film advance lever 30 in said one direction. In other words, the opposite lengthwise ends of said guide recess 16 serve as respective stoppers for defining the stroke of movement of the film advance knob 28.

The trigger portion 25 is also formed with a finger 25d having one end integrally connected with said portion 25 and the other end bent to provide a hook portion as indicated by 25e in FIG. 8, the function of which will be described later.

While the shutter cocking plate 24 is constructed in the manner as hereinabove described, the same is biased in one direction by a tension spring 31 interposed between said plate 24 and the fitting piece 18 secured to the corresponding spacer piece 15. Alternatively, this tension spring 31 may be mounted on the guide rod 17 and connect the lug 25b in the trigger portion 25 to the fitting piece 18. The shutter cocking plate 24 can be moved in the opposite direction against the tension spring 31 only when an external force is applied to the film advance knob 28, as will become apparent from the subsequent description in connection with the operation of the assembled camera with reference to FIGS. 10 to 13.

The shutter plate 27 is similarly supported by the guide rod 17 by means of a pair of spaced lugs, which are formed in said shutter plate as at 27b and 27c, respectively, while only the lug 27c is situated between the lugs 25a and 25b. This shutter plate 27 is biased by a tension spring 32, which has one end connected to the shutter plate 27 and the other end connected to the fitting piece 18, in the same direction as said shuter cocking plate 24 is pulled by the tension spring 31. Alternatively, instead of the employment of the tension spring 32, a compression spring may be employed in which case it must be interposed between the lug 27b and the other fitting piece 18 adjacent thereto while mounted on the guide rod 17. Bias of the shutter plate 27 by the tension spring 32 is restricted by a L-shaped member 33 secured to the interior surface of the wall structure 1b and having one end portion 33a serving as a stopper to which the shutter plate 27 pulled by the tension spring 32 is abutted and the other end portion 33b serving as a guide rail for sliding movement of the shutter plate 27. The shutter plate 27 is also formed with a stopper projection and a bent respectively as at 27d and 27e, the function of these being described later.

The shutter operating mechanism further includes a shutter release button 34 having one end exposed to the outside through the opening 10 in the wall structure 1a, and the other end situated between the interior surface of the wall structure 1b and a first portion 35a of a shutter release plate 35 first and second portions 35a and 35b connected at right angles with respect to each other. This shutter release plate 35 is pivotally secured to the interior surface of the wall structure 1b by a pin member 36 extending through a hole 35c, formed in the second portion 35b of said plate 35, while the first portion 35a faces the interior surface of the wall structure 1a.

The shutter release plate 35 is normally biased about the axis of the pin member 36 by a wire spring 37, one end of which is connected to the release plate 35 and the other end of which is connected to the wall structure 1b, in such a direction that the shutter release button 34 is upwardly shifted with one end of said button 34 outwardly projected through the opening 10. The first and second portions 35a and 35b of said shutter release plate 35 are respectively formed with a key 35d engageable with the hook portion 25e on the finger 25d of the trigger plate 25 and a hook 35e engageable with the bent 27e on the shutter plate 27.

In the arrangement is hereinbefore described, in order to avoid advancing the film without being exposed, the position of the stopper projection 27d on the shutter plate 27 is so selected that, after the shutter plate 28 has been moved against the tension spring 32 together with the shutter cocking plate 24 and held in position with the bent 27e of said shutter plate 27 engaged by the hook 35e of the shutter release plate 35, the shutter cocking plate 24 does not completely return to the original position by the action of the tension spring 31, but is restricted a predetermined distance to the left of the original position by the engagement between said stopper projection 27d and the lug 25a of said shutter cocking plate 24. Complete return of the shutter cocking plate 24 to the original position takes place only after the shutter release button 34 has been depressed and subsequently released. It is to be noted that, when the shutter release button 34 is depressed at this time, engagement is maintained between the hook portion 25e on the finger 25d of the trigger portion 25 and the key 35d on the first portion 35a of the shutter release plate 35 while the hook 35e of the shutter release plate 35 disengages from the bent 27e of said shutter plate 27, thereby permitting the latter to return to the original position with the exposure slit 27a passing through and in front of the camera lens positioned in register with the circular opening 13 in the wall structure 1b. This will be described in detail when reference is made to the operation of the assembled camera according to the present invention.

Referring to FIGS. 1 to 5, 8, and 9, the second body H2 will be hereinafter described. This second body H2 is formed, as best shown in FIGS. 4 and 8, with a pair of hollow portions 41 and 42 on both sides thereof. The hollow portion 41 serves as a film take-up chamber in which a film take-up cartridge of a construction as will be mentioned later may be inserted, and the other hollow portion 42 forms a part of a viewfinder passage in alignment with the front window 14 in the wall structure 1b of the first body H1. Between these hollow portions 41 and 42, the second body H2 is formed with a light passage and a film chamber respectively shown by 43 and 44. The light passage 43 is of any known construction, and the two ends of the light passage 43 are respectively made circular and rectangular. The circular end of the light passage 43 is adapted to receive a lens assembly 45 of a type which will be described later, while the rectangular end of said light passage faces the film covering said rectangular end of said light passage 43. The position of the light passage 43 should be selected such as to align with the circular opening 13 in the wall structure 1b of the first body H1, and vice versa.

The lens assembly 45 (shown in FIGS. 3, 8, and 9) is of the type comprising a lens barrel 45a housing therein a plurality of objective lenses and having one end integrally formed with a substantially radially outwardly extending flange 45b through which said lens barrel 45a is secured to a wall portion of the body H2 surrounding said circular end of said light passage 43 by the use of a plurality of set screws 45c. This lens assembly 45 includes a diaphragm plate 46 of the shape as shown in FIG. 8. It is composed of first, second, and third sections respectively designated by 46a, 46b, and 46c. The first section 46a of the diaphragm plate 46 has a pair of holes of different diameters formed therein, the second section 46b is formed with a projection 46d, and the third section 46c, the plane of which lies at right angles to the plane of said first and second sections 46a and 46b, has a connecting hole 46e formed therein for receiving therein a projection 47a of a disphragm adjusting knob 47. A slot 46f is formed in said diaphragm plat 46 at a portion joining between said first and second sections 46a and 46b.

The diaphragm plate 46 is mounted at 48 to a wall portion of the body H2 between the hollow portion 42 and the light passage 43 by means of a fitting screw 46g extending through said slot 46f and tapped into the wall portion 48, while the first section 46a slidably extends across the lens barrel 45a and between the objective lenses within said barrel 45a. The stroke of movemet of said plate 46 is defined by the size of the slot 46f such that the holes or apertures in the first section 46a of said diaphragm plate 46 are selectively positioned in alignment with the optical axis of said lens assembly. In this arrangement, the third section 46c slides on the plane above the film chamber 44. The diaphragm adjusting knob 47 has a portion extending through the opening 12 in the wall structure 1a so that a photographer can, by moving said knob 47 in either direction, selectively bring the two apertures in the first section 46a in alignment with the optical axis of the lens assembly depending upon the weather condition during an actual taking of a picture.

A wire spring 49 having one end firmly engaged to the projection 46d in the second section 46b of the diaphragm plate 46 and the other end connected to the fitting screw 46g acts to give a snap action to the movement of said diaphragm plate 46, thereby ensuring that either of the apertures in the first section 46a is exactly aligned with the optical axis of the lens assembly.

As best shown in FIGS. 3 to 5 and 8, the second body H2 is also formed with an elongated slot 50 extending above the rectangular end of the light passage 43. The film advance lever 30 is exposed throught the slot 50 as shown in FIGS. 5 and 9 for selective engagement in film perforations formed along one edge of the film to be passed on a guide surface as at 51. It is to be noted that the film advance lever 30 projects outwardly from the elongated slot 50 only when the film is not loaded or when it is engaged in any of the film perforations. The film advance lever 30 is inwardly retracted and pivoted about the axis of the screw 30a against the wire spring 30b when said lever 30 is in contact with the non-perforated portion of the film between each pair of the adjacent film perforations.

Reference numerals 51 and 52 (FIGS. 5 and 8) represent a film support and the film cartridge, respectively. The film support 51 is utilized to accommodate therein a length of unexposed film for facilitating an easy loading of the film into the film chamber 44 without the film being touched by hand. The film cartridge 52 is adapted to be accommodated in the film take-up chamber 41, into which the film that has been exposed is taken up frame by frame in response to movement of the film advance knob 28. This film cartridge 52 comprises, as may be seen in FIG. 8 a pair of casings 52a and 52b which fit to each other to represent a substantially cylindrical shape having a film entrance, said film entrance being, when and so long as said film cartridge 52 is mounted in said film take-up chamber 41, situated at the same level as the plane of the guide surface 51 as shown in FIG. 5. The film cartridge 52 is mounted in the film take-up chamber 41 with a film guide 52c which ensures that the film that has been taken up convolutes within said film cartridge 52. As is the case of commercially availabl 35 mm. film cartridges, the film entrance of this film cartridge 52 is covered with a piece of cloth 52d for shading the light and concurrently for preventing the emulsion on one surface of the film from being scratched as may otherwise occur during entrance of the film into said film cartridge.

The film support 51 and the cartridge 52 may be omitted if the chambers 41 and 44 in the second body H2 are respectively so sized as to steadily accommodate a roll of film therein.

Referring now to FIGS. 1, 2, 8, and 9, the third body H3 will be hereinafter described. The third body has the wall structures 3a and 3b as hereinbefore described.

As best shown in FIG. 8, the wall structure 3a is formed with a rectangular viewing window 60 which is smaller in surface area than the rectangular window 14 in the wall structure 1b of the first body H1, but in alignment with said rectangular window 14 through the hollow portion 42 in the second body H2. A combination of the elements 14, 42, and 60 constitute a camera viewfinder, the function of which is well understood by those skilled in the art. It is to be noted that, although not shown, this camera viewfinder may be provided with glasses and/or lens elements for the purpose known to those skilled in the art.

A portion 61 in the wall structure 3a, facing the guide surface 51 in the second body H2 is slightly inwardly projected from the remaining portions of said wall structure 3a. The projected portion 61 serves as a film presser which, in cooperation with the guide surface 51, keeps each portion of the film across the rectangular end of the light passage 43 in a flat position.

An elongated groove 62 (FIG. 9) is formed in the wall structure 3a at a position corresponding to the elongated slot 50 in the second body H2 (FIG. 5) for providing a clearance in which a portion of the film advance lever 30 projected from said slot 50 through the film perforation is loosely accommodated. Formed above said elongated groove 62 and extending in parallel relation to said groove 62 is a slot 63 through which the projection 25c in the trigger portion 25 of the shutter cocking plate 24 extends for engagement with the film advance knob 28 by means of the connecting strip 29.

The operation of the above described compact camera will now be described with reference to FIGS. 10(a) and (b) to 13(a) and (b). It is to be noted that the conditions of various mechanisms of the camera respectively shown in the drawings (a) and (b) of each figure correspond to each other.

Assuming that a roll of film, although not shown in the accompanying drawings, has been already loaded in the camera with the film advance lever 30 engaged in one of the film perforations, FIGS. 10(a) and (b) illustrate that the shutter plate 27 has not yet been change in position to make the camera ready to take a picture of an object to be photographed. In other words, unless the shutter plate 27 is otherwise changed in position, depression of the shutter release button 34 does not operate the shutter plate 27. In order to ready the shutter plate 27, for operation engagement between the bent 27e of said shutter plate 27 and the hook 35e of the shutter release plate 35 should be made. This can be simply achieved by moving the film advance knob 28, thereby causing the trigger portion 25 of the shutter cocking plate 24 to move along the guide rod 17 against the tension spring 31.

As the film advance lever 28 is thus moved, i.e., as the shutter cocking plate 24 is moved along the guide rod 17 against the tension spring 31, the lug 25a on the trigger portion 25 of said plate 24 abuts against the lug 27b on the shutter plate 27, whereby the latter thereafter accompanies the shutter cocking plate 24, moving against the tension spring 32 in the same direction as the shutter cocking plate 24.

Simultaneously therewith, the film is advanced in to the film cartridge 52 with the film advance lever 30 engaged in the film perforation, the amount of advance of the film corresponding to the width of one frame of film.

It is to be noted that engagement between the bent 27e of the shutter plate 27 and the hook 35e of the shutter release plate 35 takes place after the exposure slit 27a in the shutter plate 27 has been completely covered by the shielding portion 26 of the shutter cocking plate 24. Accordingly, even if the exposure slit 27a traverses the circular opening 13 in alignment with the optical axis of the lens assembly 45 during movement of the shutter plate 27 against the tension spring 32 accompanied by the shutter cocking plate 24, no rays of light entering the circular opening 13 as reflected on the object to be photographed are transmitted to the lens assembly 45 and then to the film.

Figure 11A:
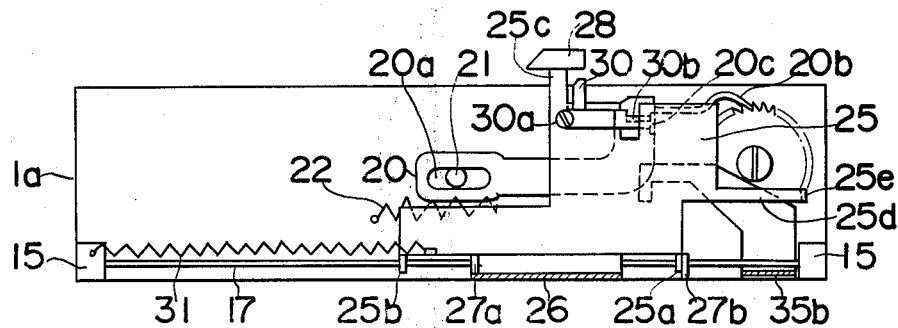
Figure 11B:
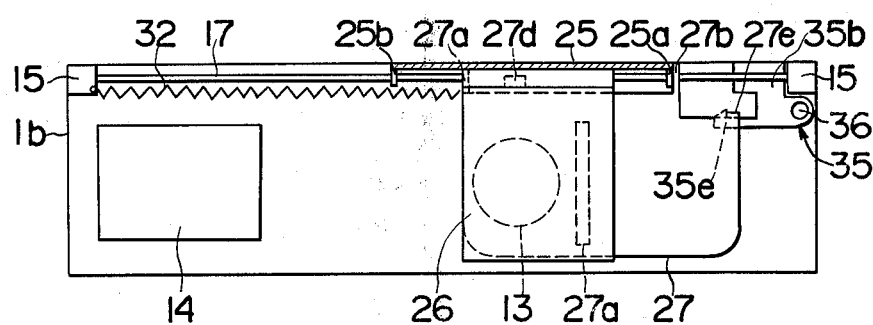

FIGS. 11(a) and (b) illustrate the condition in which the film advance lever 28 has been completely moved in the condition in which the direction of the frame counter, or, in other words, the shutter cocking plate 24 has been completely moved against the tension spring 31. Prior to establishment of this condition, the actuator 30b on the film advance lever 30 pivotally carried by the trigger portion 25 of the shutter cocking plate 24 presses the abutment 20c on the slider 20, thus causing the slider 20 to move against the elastic member 22 and, at the time of establishment of the condition of FIGS. 11(a) and (b), the ratchet wheel 19 is rotated about the axis of the screw 19a by the nail 20b carried by said slider 20.

Upon completion of a stepwise rotation of the ratchet wheel 19 caused by the nail 20b engaging in between two adjacent teeth on the periphery of the ratchet wheel 19, the first one of the figures which are embossed, or otherwise imprinted on the surface of the ratchet wheel 19 is exposed to the outside through the opening 11 in the wall structure 1a of the first body H1, thus visually indicating to the photographer, that the first frame of film is ready to be exposed.

On the other hand, upon establishment of this condition, the bent 27e of the shutter plate 27 becomes engaged by the hook 35e of the shutter release plate 35. This engagement between the bent 27e and the hook 35e takes place in such a manner that the former slides over the hook 35e while causing the shutter release plate 35 to pivot about the axis of the fitting screw 36 against the wire spring 37.

As soon as the film advance knob 28 has been relieved from the external force that has been applied thereto to establish the condition of FIGS. 11(a) and (b), it returns toward its original position due to the force of the expanded tension spring 31 on the shutter cocking plate 24. However, it is to be noted that the return movement of the shutter cocking plate 24 urged by the tension spring 31 does not cause a corresponding movement of the shutter plate 27. This is because the shutter plat 27 has been already charged or cocked in position with the bent 27e engaged by the hook 35e of the shutter release plate 35.

Figure 12A:
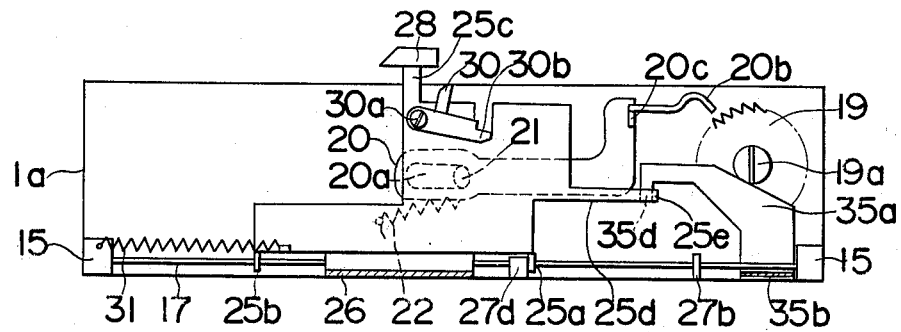

However, during the return movement of the shutter cocking plate 24, the latter is halted at a position a predetermined distance preceding the original position, the condition of which is illustrated in FIGS. 12(a) and (b).

More specifically, upon the knob 28 being relieved from the external force that has been applied thereto as hereinbefore described, the shutter cocking plate 24 is urged to return to the original position by the tension spring 31 then expanded. The expanded tension spring 31 exerts a pulling force greater than the circumferentially acting force exerted by the wire spring 30c then acting to ensure a firm engagement of the film advance lever 30 in the film perforation, whereby said lever 30 becomes disengaged from said film perforation, pivots about the axis of the screw 30a against said wire spring 30c, and subsequently slides in contact with the non-perforated portion of the film as shown in FIG. 12(a).

Figure 12B:
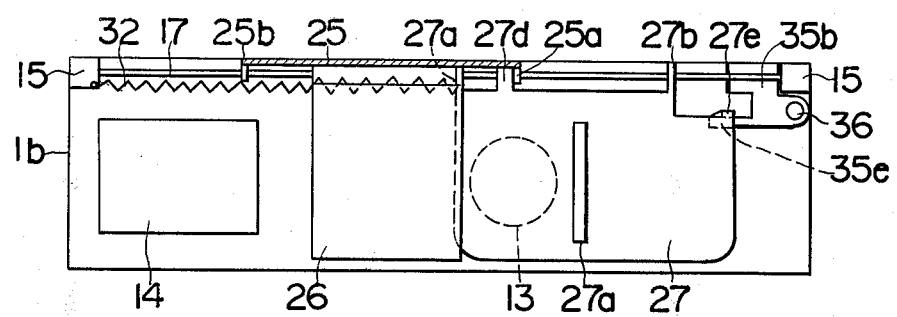

During the return movement of the shutter cocking plate 24 and after said plate 24 has completely passed in front of the lens assembly 45 by the action of the tension spring 31, the lug 25a on the trigger portion 25 of the shutter cocking plate 24 engages the projection 27d on the shutter plate 27 as clearly shown in FIG. 12(b). At this time, as best shown in FIG. 12(a), the hook portion 25e in the finger 25d of the trigger portion 25 of the shutter cocking plate 24 is brought on position ready to be engaged by the key 35d in the first section 35a of the shutter release plate 35.

The camera with the various mechanisms conditioned as shown in FIGS. 12(a) and (b) is ready to take a picture of the target object at which the photographer viewing through the viewfinder has aimed. That is, the picture may be taken at any time the shutter release button 34 is depressed.

Figure 13B:
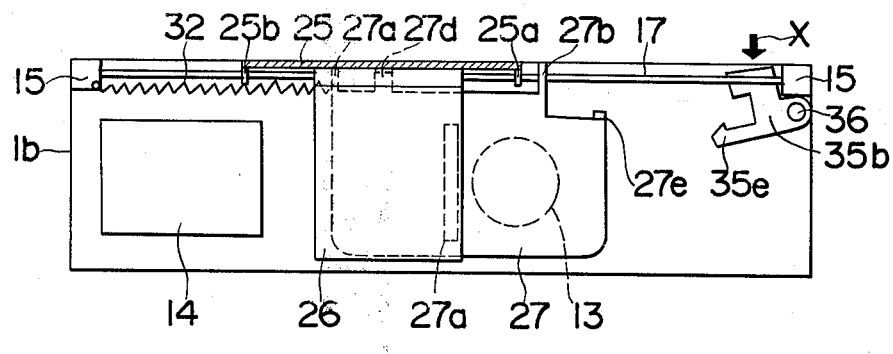

As the shutter release button 34 is depressed as indicated by the arrow X in FIG. 13(b), the shutter release plate 35 pivots against the wire spring 37 about the axis of the fitting screw 36. Upon pivot of the shutter release plate 35, the key 35d in the first section 35a of said shutter release plate 35 engages the hook portion 25e on the finger 25d as shown in FIG. 13(a) preventing the shutter cocking plate 24 from being moved to othe original position by the action of the tension spring 31 during subsequent movement of the shutter plate 27 as will be described later.

Subsequently or simultaneously therewith, the hook 35e of the shutter release plate 35 disengages from the bent 27e of the shutter plate 27, thus permitting the shutter plate 27, to return to its original position under the influence of the tension spring 32. As shown in FIG. 13(a) the projection 27d moves away from the lug 25a. During this return movement of the shutter plate 27, the exposure slit 27a instantaneously passes across the circular opening 13 in alignment with the optical axis of the lens assembly 45 and the film is therefore exposed to the rays of light carrying an image of the object to be photographed.

At this time, because of the engagement between the key 35d and the hook portion 25e, the shutter cocking plate 24 remains in the same position so long as the shutter release button 34 is depressed. This ensures that no arbitrary movement of the film in contact with the film advance lever 30, takes place during exposure, i.e., during movement of the shutter plate 27. Such arbitrary movement may otherwise result in a blurred picture of the object to have been photogaphed.

As soon as the external pushing force which has been applied to the button 34 is removed, the shutter release button 34 is caused project to outwardly due to the pivoting of the shutter release plate 35 under the urging of the wire spring 37, The pivoting of the shutter release plate 35 also cause, the engagement between the key 35d and the hook portion 25e to release. The shutter cocking plate 24 then returns to the original position as shown in FIGS. 10(a) and (b) with the film advance lever 30 engaged in the subsequent one of the film perforations, thus permitting the various mechanisms of the camera to be conditioned as shown in FIGS. 10(a) and (b) in readiness for the subsequent taking of a picture.

From the foregoing full description of the camera according to the present invention, it has now become obvious that the camera utilizes few parts, costing only a fraction of the price of the currently commercially available camera of a similar kind. Furthermore, its camera according to the present invention is simple in construction and easy to operate without substantially requiring any skill concerned of photography. Once the whole frames of film have been exposed, the user or photographer is merely required to change the camera with another one of the same kind at his camera shop or to ask his camera shop to replace a new roll of film by the exposed film. However, with a slight modification, the camera according to the present invention can be made to accommodate a currently commercially available 16 mm. film cartridge.

Although the present invention has been fully disclosed by way of the preferred embodiment thereof shown in the accompanying drawings, it is to be noted that various changes and modifications, including those mentioned in the foregoing description, are apparent to those skilled in the art. For example, in addition to those mentioned in the foregoing description, the nail 20b used to rotate the ratchet wheel 19 of the frame counter mechanism may be integrally formed with, or otherwise supported by, said film advance lever 30 or the trigger portion 25 of the shutter cocking plate 24, in which case the slider 20 and its associated parts can be omitted. Therefore, unless such changes and modifications otherwise depart from the true scope of the present invention, they should be construed as included therein.

What is claimed is:

1. A compact photographic camera which comprises in combination:
   a housing structure including a viewfinder through which an object to be photographed is aimed at, a film chamber adapted to accommodate therein a roll of unexposed film, a film take-up chamber adapted to accommodate the roll of film after said film has been exposed and transferred from said film chamber thereto, said film having a plurality of equidistantly spaced film perforations along a portion adjacent to at least one of the opposite lengthwise edges of said film, and a light passage through which said film is exposed;
   a lens assembly carried by said housing structure in alignment with said light passage;
   a first plate means having an exposure aperture and being movable between inoperative and operative positions across the optical axis of said lens assembly with said exposure aperture traversing said optical axis of said lens assembly, said film being exposed only when said first plate means moves from said operative position to said inoperative position with said exposure aperture substantially aligned with said lens assembly;
   a first means for biasing said first plate means in one direction to said inoperative position;
   a second plate means movable between first and second positions, said first plate means being moved to said operative position in response to movement of said second plate means from said first position when an external force is applied to osaid second plate means;
   a second means for biasing said second plate means in one direction to said first position and for returning said second plate means to said first position from said second position when said external force is removed;
   a shutter release button;
   means operatively associated with said shutter release button for engagement with said first plate means to permit the latter to be held in said operative position against said first biasing means when said first plate means is moved to said operative position, said operatively associated means being, when said shutter release button is depressed, capable of disengaging said first plate means thereby to permit the latter to move to said inoperative position;
   means for advancing the film from said film chamber to said film take-up chamber, each time said film has been exposed, in response to the movement of said second plate means from said first position to said second position;
   means for holding said second plate means at a position a predetermined distance preceding said first position during the movement of said second plate means from said second position to said first position;
   and
   means for completely returning said second plate means to said first position after said first plate means has returned from said operative position to said inoperative position.

2. A compact camera as claimed in claim 1 and further comprising:
   a frame counter including a ratchet wheel rotatably supported by said housing structure for stepwise rotation about the axis thereof, one surface of said ratchet wheel having a plurality of equidistantly spaced numerical figures arranged in serial order for showing the number of frames of said film either exposed or left unexposed, and
   means for rotating said ratchet wheel stepwise each time said film has been exposed.

3. A compact camera as claimed in claim 2 wherein said stepwise rotating means comprises a nail member supported by said second plate means for selective engagement with teeth of said ratchet wheel in response to the movement of said second plate means from said first position to said second position.

4. A compact camera as claimed in claim 1 wherein said film advancing means comprises a film advance lever pivotally carried by said second plate means and means for pivoting said film advance lever in one direction for engagement in any one of the film perforations, said film advance lever being pivotable in the opposite direction against biasing means when said lever slides in contact with non-perforated portions in said film, frame-to-frame transfer of said film from said film chamber to said film take-up chamber being effected only when said second plate means is moved from said first position to said second position with said film advance lever engaged in a selected one of the film perforations.

5. A compact camera as claimed in claim 1 and further comprising a film advance knob situated outside said housing structure and connected to said second plate means, whereby said external force may be applied to said film advance knob to move said second plate means from said first position to said second position.

6. A compact camera as claimed in claim 1 wherein said means for advancing the film are disengaged from said film during the return movement of said second plate means from said second position to said first position.

7. In a photographic camera comprising:
   a. a housing structure containing a light passage through which film is exposed;
   b. a first plate means having an exposure aperture and being movable between inoperative and operative positions across the optical axis of said light passage with said exposure aperture traversing said optical axis;
   c. a first means for biasing said first plate means towards its inoperative position;
   d. a second plate means movable between first and second positions;
   e. means for advancing film in the camera in response to the movement of said second plate means from its first position to its second position;
   f. a second means for biasing said second plate means towards its first position;
   g. means for moving said first plate means to its operative position in response to movement of said second plate means from its first position to its second position when an external force is applied to said second plate means; and
   h. means for engaging said first plate means to hold it in its operative position aginst said first means, the improvement comprising:
      i. means for holding said second plate means at a position a predetermined distance preceding its first position during the movement of said second plate means from its second position to its first position and
      ii. means for completely returning said second plate means to its first position after said first plate means has returned from its operative position to its inoperative position, thereby ensuring that no arbitrary movement of the film in said housing structure takes place while a picture is being taken.

* * * * *